(12) United States Patent
Sharma et al.

(10) Patent No.: US 9,540,546 B2
(45) Date of Patent: Jan. 10, 2017

(54) COMPOSITE REUSABLE ADHESIVE

(75) Inventors: Ashutosh Sharma, Kanpur (IN); Sandip Patil, Kanpur (IN)

(73) Assignee: INDIAN INSTITUTE OF TECHNOLOGY KANPUR, Kanpur, Uttar Pradesh (IN)

( * ) Notice: Subject to any disclaimer, the term of this patent is extended or adjusted under 35 U.S.C. 154(b) by 285 days.

(21) Appl. No.: 13/982,458

(22) PCT Filed: Mar. 9, 2012

(86) PCT No.: PCT/IB2012/051122
§ 371 (c)(1),
(2), (4) Date: Jul. 29, 2013

(87) PCT Pub. No.: WO2013/093652
PCT Pub. Date: Jun. 27, 2013

(65) Prior Publication Data
US 2013/0299078 A1    Nov. 14, 2013

(30) Foreign Application Priority Data
Dec. 19, 2011 (IN) .......................... 3719/DEL/2011

(51) Int. Cl.
*C09J 7/02* (2006.01)
*C09J 7/00* (2006.01)
*C09J 121/00* (2006.01)
*B32B 37/12* (2006.01)
*C09J 4/06* (2006.01)

(52) U.S. Cl.
CPC ............... *C09J 7/021* (2013.01); *B32B 37/12* (2013.01); *C09J 4/06* (2013.01); *C09J 7/0214* (2013.01); *C09J 7/0217* (2013.01); *C09J 7/0221* (2013.01); *C09J 121/00* (2013.01); *B32B 2405/00* (2013.01); *C08L 2312/08* (2013.01);
(Continued)

(58) Field of Classification Search
None
See application file for complete search history.

(56) References Cited

U.S. PATENT DOCUMENTS 4,112,177 A * 9/1978 Salditt .................... A61F 13/02
427/208.8
4,581,281 A * 4/1986 Gerace ...................... C09J 7/00
428/215

(Continued)

FOREIGN PATENT DOCUMENTS

CA     1312185     1/1996
CN     1471565     1/2004
(Continued)

OTHER PUBLICATIONS

Machine translation of JP 08312717 A (1996).*
(Continued)

*Primary Examiner* — Frank D Ducheneaux
(74) *Attorney, Agent, or Firm* — Dorsey & Whitney LLP

(57) ABSTRACT

A pressure-sensitive adhesive material including a viscoelastic layer and an elastic layer is provided. In some embodiments, a reusable pressure-sensitive adhesive material exhibiting high adhesive strength after repeated cycles of adhesion and detachment is provided. In some embodiments, methods of making a pressure sensitive adhesive material are provided.

33 Claims, 13 Drawing Sheets

(52) U.S. Cl.
CPC .. *C09J 7/00* (2013.01); *C09J 7/02* (2013.01); *C09J 2201/36* (2013.01); *Y10T 428/2861* (2015.01)

(56) References Cited

U.S. PATENT DOCUMENTS

| | | | |
|---|---|---|---|
| 5,449,553 | A | 9/1995 | Griffith |
| 6,221,454 | B1 | 4/2001 | Saito et al. |
| 6,630,239 | B2* | 10/2003 | Cernohous ............ C09J 121/00 428/354 |
| 6,740,412 | B2 | 5/2004 | Oreins et al. |
| 7,175,898 | B2 | 2/2007 | Luhmann et al. |
| 2004/0003883 | A1 | 1/2004 | Kiuchi et al. |
| 2007/0054081 | A1 | 3/2007 | DeMarco |
| 2007/0122570 | A1* | 5/2007 | Honda et al. ................... 428/31 |
| 2007/0218276 | A1* | 9/2007 | Hiramatsu ............ C09J 7/0217 428/354 |
| 2010/0233467 | A1* | 9/2010 | Niwa et al. .................... 428/323 |
| 2011/0293953 | A1* | 12/2011 | Tomita et al. ................. 428/447 |
| 2012/0121900 | A1* | 5/2012 | Niwa ..................... C09J 7/0217 428/355 AC |
| 2012/0123046 | A1* | 5/2012 | Niwa ..................... C09J 133/26 524/548 |

FOREIGN PATENT DOCUMENTS

| | | | |
|---|---|---|---|
| EP | 0 769 040 | | 8/2002 |
| JP | 08-001870 | A | 1/1996 |
| JP | 08-188755 | A | 7/1996 |
| JP | 08312717 | A * | 11/1996 |
| JP | 10-044292 | A | 2/1998 |
| JP | 2001-294828 | A | 10/2001 |
| JP | 2007-045967 | A | 2/2007 |
| JP | 2010-526910 | T | 8/2010 |
| JP | 2010-526931 | T | 8/2010 |
| JP | 2011-502201 | T | 1/2011 |
| JP | 2011-231313 | A | 11/2011 |
| WO | WO 2005/110737 | | 11/2005 |
| WO | WO2005110737 | | 11/2005 |
| WO | WO 2009/086056 | | 7/2009 |
| WO | WO 2009086056 | | 7/2009 |

OTHER PUBLICATIONS

Carelli et al., Effect of a Gradient in Viscoelastic Properties on the Debonding Mechanisms of Soft Adhesives, The Journal of Adhesion, 2007, pp. 491-505, vol. 83.
Chaudhury et al., The Influence of Elastic Modulus and Thickness on the Release of the Soft-Fouling Green Alga Ulva Linza (syn. Enteromorpha Linza) from Poly(Dimethylsiloxane) (PDMS) Model Networks, Biofouling, 2005, pp. 41-48, vol. 21 (1).
Chung et al., "Soft and Hard Adhesion," The Journal of Adhesions, 2005, pp. 1119-1145, vol. 81.
Creton et al., "Bulk and Interfacial Contributions to the Debonding Mechanisms of Soft Adhesives: Extension to Large Strains," Langmuir, 2001, pp. 4948-4954, vol. 17.
Creton, "Pressure-Sensitive Adhesives: An Introductory Course," MRS Bulletin, Jun. 2003, pp. 434-439, vol. 28.
Deplace et al., "Fine Tuning the Adhesive Properties of a Soft Nanostructured Adhesive with Rheological Measurements," The Journal of Adhesion, 2009, pp. 18-54, vol. 85.
Fuller et al., "The Effect of Surface Roughness on the Adhesion of Elastic Solids," Proc. R. Soc. Lond. A., 1975, pp. 327-342, vol. 345.
Ghatak et al., "Peeling from a Biomimetically Patterned Thin Elastic Film," Proc. R. Soc. Lond. A., 2004, pp. 2725-2735, vol. 460.
Ghatak, "Peeling Off an Adhesive Layer with Spatially Varying Modulus," Physical Review E, 2.010, pp. 021603-6 to 021603-6, vol. 81.
Greenwood et al. "The Mechanics of Adhesion of Viscoelastic Solids," Philosophical Magazine A., 1981, pp. 697-711, vol. 43 (3).
Hui et al., "The Mechanics of Tack: Viscoelastic Contact on a Rough Surface," Potvin. Sci. Part B. Polym. Phys., 2000, vol. 1485-1495, vol. 38.
International Search Report and Written Opinion received in International Application No. PCT/IB2012/051122, dated Jul. 2, 2012, filed Mar. 9, 2012.
Leger et al., "Adhesion Mechanisms at Soft Polymer Interfaces," Phil. Trans. R. Sac. A., 2008, pp. 1425-1442, vol. 366.
Majumder et al., "Microfluidic Adhesion Induced by Subsurface Microstructures," Science, Oct. 12, 2007, pp. 258-261, vol. 318.
McGinniss, "Advances in Environmental Benign Coatings and Adhesives," Progress in Organic Coatings, Jan.-Apr. 1996, pp. 153-161, vol. 27(1-4).
Passade et al., "Fracture Toughness of Interfaces Between Glassy Polymers in a Trilayer Geometry," Polymer, 2000, pp. 9249-9263, vol. 41.
Patil et al., "A Reusable and Antifouling Viscoelastic Adhesive with an Elastic Skin," Langmuir, Dec. 27, 2011, pp. 42-46, vol. 28(1).
Peppas et al., "Hydrogels as Mucoadhesive and Bioadhesive Materials: A Review," Biomaterials, 1996, pp. 1553-1561, vol. 17.
Peressadko et al., "Influence of Surface Roughness on Adhesion Between Elastic Bodies," Physical Review Letters, Sep. 16, 2005, pp. 124301-1 to 124301-4, vol. 95.
Shull et al., "Deformation Behavior of Thin, Compliant Layers Under Tensile Loading Conditions," Journal of Polymer Science, Part B: Polymer Physics, 2004, pp. 4023-4043, vol. 42.
Townsin, "The Ship Hull Fouling Penalty," Biofouling, 2003, pp. 9-15, vol. 19.
Wei et al., "Interface Strength, Work of Adhesion and Plasticity in the Peel Test," International Journal of Fracture, 1998, pp. 315-333, vol. 93.

* cited by examiner

COMPOSITE REUSABLE ADHESIVE

CLAIMS FOR PRIORITY

This application is the U.S. National Phase entry under 35 U.S.C. §371 of PCT/IB2012/051122, filed Mar. 9, 2012, which claims the benefit of priority to Indian Application No. 3719/DEL/2011, filed on Dec. 19, 2011, the entire disclosure of which is hereby incorporated by reference herein.

TECHNICAL FIELD

Some embodiments herein generally relate to pressure-sensitive adhesive materials, methods of making, and methods of use.

BACKGROUND

Pressure sensitive adhesives (PSA's) are used in a wide variety of applications and have varying levels of adhesiveness and reusability. Visco-elasticity (also known as plasticity or tackiness) of a pressure sensitive adhesive gives the PSA its adhesive strength during peeling and debonding.

SUMMARY

In some embodiments, a pressure-sensitive adhesive material is provided. In some embodiments, the pressure-sensitive adhesive is reusable. In some embodiments, the pressure-sensitive adhesive material includes a visco-elastic layer and an elastic skin layer. In some embodiments, pressure sensitive adhesive material includes a sandwich viscoelastic layer between two elastic layers.

In some embodiments, methods of making a pressure-sensitive adhesive material are provided. In some embodiments, the method includes providing a visco-elastic layer, applying an elastic layer over a surface of the visco-elastic layer, and curing the visco-elastic layer and the elastic layer as required. In some embodiments, the method includes providing an elastic layer first, applying viscoelastic layer over the surface of the elastic layer and applying one more top elastic layer, and curing the layers as necessary, thereby making a double-sided pressure-sensitive adhesive layer.

In some embodiments, methods of using and re-using a pressure-sensitive adhesive material are provided. In some embodiments, the method includes providing a pressure-sensitive adhesive material, the material including a visco-elastic layer and an elastic layer placed over the visco-elastic layer. In some embodiments one further adheres an adhesive surface of the pressure-sensitive material to a first surface, detaches the adhesive surface from the first surface, and adheres the adhesive surface to a second surface.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION OF THE PREFERRED EMBODIMENT

Figure 1:
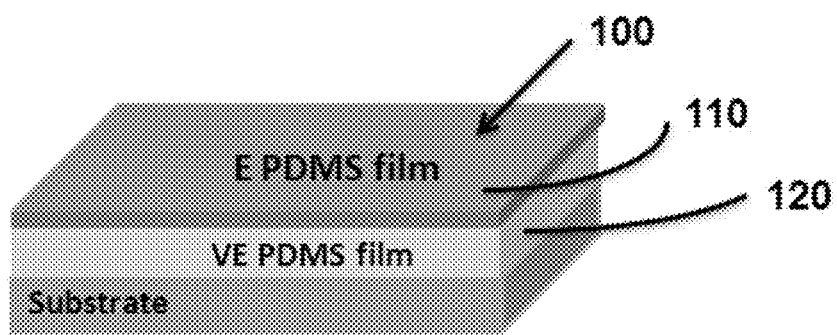
FIG. 1A is a drawing depicting some embodiments of a pressure-sensitive adhesive material on a substrate or backing layer.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Elasticity and viscoelasticity (also known as plasticity) play roles in the performance of soft pressure sensitive adhesives. An effective pressure sensitive adhesive during bonding should flow and deform easily to contact the surface conformally. During debonding, on the other hand, it should have a sufficient cohesive strength to resist a bulk failure and large energy dissipation for greater work of adhesion. The debonding is often accompanied by morphological changes such as fingering, cavitations, and fibrillation, both in elastic as well as in visco-elastic adhesives; the processes that dissipate energy and form the major contributions to the total fracture toughness of an adhesive tape. Although the fracture toughness thus achieved by a viscoelastic layer may be satisfactory, the viscoelasticity of tackiness also prevents reusability. Previously, the surface changes that occur during detachment such as generation of a rough surface, cohesive failure and particulate contamination were often permanent and were unavoidable in the case of soft visco-elastic surfaces. Rheological properties thus play a role in pressure sensitive adhesives (PSA's) and hence different ways of controlling rheological properties are utilized in both natural as well as commercial adhesives. While in commercially available adhesives, rheological properties are mostly uniform and isotropic and controlled by playing with chemical structures and additives, in natural adhesive pads such as found in geckoes and insects, pad stiffness is controlled by complex and hierarchical composite structures.

As noted above, viscoelasticity can make a pressure sensitive adhesive non-reusable because of fouling of its surface owing to its higher adhesion and because of cohesive failure owing to its weak mechanical strength. In contrast, elastic pressure sensitive adhesives have low adhesion strength, but are highly non-fouling and have a high mechanical strength (lower cohesive failure). Thus, traditionally, high adhesive strength and reusability involve conflicting demands.

Provided herein are various composite pressure sensitive adhesives (e.g., an elastic layer over a visco-elastic layer, "E/VE PSA"). In some embodiments a reusable pressure-sensitive adhesive material having good structural integrity and adhesive strength is provided. In some embodiments, the pressure-sensitive adhesive material includes a viscoelastic layer (e.g., a visco-elastic bulk layer), and an elastic layer (which can be thinner, e.g., an elastic thin-skin layer). In some embodiments, the pressure sensitive material has high adhesive strength, good structural integrity, and the ability to separate cleanly from a surface. In some embodiments, the pressure sensitive material has an adhesive surface with non-fouling characteristics. Some embodiments provide methods of making a reusable pressure-sensitive material. Some embodiments provide methods of using a reusable pressure-sensitive material, for example using the pressure-sensitive adhesive material in multiple cycles of adhesion, detachment, and/or cleaning.

In some embodiments, a composite pressure-sensitive adhesive material is provided. In some embodiments, the pressure-sensitive adhesive material contains a visco-elastic layer. In some embodiments, the pressure-sensitive adhesive material contains an elastic layer. In some embodiments, the elastic layer is placed over the visco-elastic layer. In some embodiments, viscoelastic layer is covered on both sides by thin elastic layers. In some embodiments, one side of viscoelastic layer covered by thin elastic layer and other side covered by thick elastic layer or by a backing layer as defined in. In some embodiments, any backing layer can be used, such as, but not limited to, cloths, thin metal foils, thin polymer sheets and flexible films, fabric web, paper and flexible laminates.

FIG. 1 illustrates some embodiments of pressure-sensitive adhesive material 100. In some embodiments, the material contains an elastic layer 110. In some embodiments, the material contains a viscoelastic layer 120. In some embodiments, the elastic-thin skin layer 110 is placed over the visco-elastic layer 120. While the PSA in FIG. 1 is shown on a substrate, the substrate can be flexible laminates, fabric web, paper, metal foils, and plastic sheet or any backing layer.

In some embodiments, the elastic layer (E) is adjacent to a surface of the visco-elastic layer (VE). In some embodiments, the elastic layer directly contacts a surface of the visco-elastic layer. In some embodiments, at least one additional layer is positioned between the elastic layer and the visco elastic bulk layer. In some embodiments, an additional viscoelastic layer is sandwich between two elastic layers. In some embodiments, a portion of the elastic layer contacts a portion of the visco-elastic layer, while at least one additional layer is positioned between a portion of the viscoelastic layer and the elastic layer. In some embodiments, the elastic layer covers at least 1% of the surface of the visco-elastic layer, e.g., 1, 2, 5, 10, 20, 30, 40, 50, 60, 70, 80, 90, 95, 98, 99, or 100% of the surface, including any range above any one of the preceding values. In some embodiments, the visco-elastic layer supports at least 1% of the surface of the elastic layer, e.g., 1, 2, 5, 10, 20, 30, 40, 50, 60, 70, 80, 90, 95, 98, 99, or 100% of the surface, including any range above any one of the preceding values. In some embodiments the elastic layer can be physically positioned adjacent to cleaning adhesive tape layer (e.g., during cleaning of the ENE PSA using an adhesive tape).

In some embodiments, the elastic layer is thinner than the visco-elastic layer. In some embodiments, the thickness of elastic layer is no more than about 50% of the thickness of the visco-elastic layer, e.g., 25, 20, 15, 14, 13, 12, 11, 10, 9, 8, 7, 6, 5, 4, 3, 2, 1, 0.9, 0.8, 0.7, 0.6, 0.5, 0.4, 0.3, 0.2, or 0.1% of the thickness of the visco-elastic layer, including any between any two of the preceding values and any single range below any one of the preceding values. In some embodiments, the elastic layer is substantially the same thickness as the visco-elastic layer.

In some embodiments, the thickness of each layer (elastic and visco-elastic) can be uniform throughout the layer. In some embodiments, the thickness varies throughout the layer, (in such situations, "thickness" refers to the average thickness of the layer). In some embodiments, the viscoelastic layer has a thickness of at least about 1 micrometers, e.g., 2, 4, 10, 40, 100, 150, 200, 250, 300, 350, 370, 390, 400, 410, 420, 430, 440, 460, 480, 500, 520, 540, 560, or 600 micrometers, including any ranges above any one of the preceding values, or between any two of the preceding values. In some embodiments, the elastic layer has a thickness that is less than a thickness of the visco-elastic layer, e.g., about 0.5 micrometers, 1, 1.5, 2, 2.5, 3, 4, 5, 6, 8, 9, 10, 11, 12, 13, 14, 15, 18, 20, 25, 30, 35, 40, 45, 50, 55, 60, 65, 70, 80, 90, 100, 120, 150, or 200 micrometers, including any ranges below any one of the preceding values or between any two of the preceding values.

In some embodiments, the elastic layer has a thickness that is substantially uniform. In some embodiments, some portions of the elastic layer are thinner than other portions of the elastic layer. In some embodiments, the visco-elastic layer has a thickness that is substantially uniform. In some embodiments, some portions of the visco-elastic layer are thinner than other portions. In some embodiments, if either or both of the visco-elastic layer does not have a substantially uniform thickness, the percentage thickness of the elastic layer is calculated using the average thickness of the layer or layers that do not have a substantially uniform thickness.

In some embodiments, the visco-elastic layer includes a cross-linked elastomer. In some embodiments, the cross-linked elastomer of the visco-elastic layer includes cross-linked polydimethylsiloxane; however, other cross-linked elastomers can also be employed, e.g., silicone, polymeric organosilicon, acrylics, butyl rubber, ethylene-vinyl acetate, natural rubber, nitriles, silicone rubber, styrene block copolymers, styrene-butadiene-styrene, styrene-ethylene/butylene-styrene, styrene-ethylene/propylene, styrene-isoprene-styrene, vinyl ethers, acrylate copolymer, a mono-acrylate oligomers, polyurethane. In some embodiments, the ratio (w/w) of elastomer to cross-linking agent used in the visco-elastic layer is about 200:1, 100:1, 70:1, 60:1, or 50:1, including any ranges below any of the preceding values. In some embodiments, the percent of crosslinker (or percent of cross-linking agent) used in the visco-elastic layer is less than 2%, e.g., 1.9, 1.8, 1.7, 1.6, 1.5, 1.4, 1.3, 1.2, 1.1, 1, 0.9, 0.8, 0.7, 0.6, 0.5, 0.4, 0.3, 0.2, 0.1, or less, including any range between any two of the preceding values and any range beneath any one of the preceding values. In some embodiments, any pressure sensitive adhesive can be used as the visco-elastic layer, as long as the layer is viscoelastic in comparison to the elastic layer.

In some embodiments, the elastic layer contains a cross-linked elastomer. In some embodiments, the cross-linked elastomer of the elastic layer includes cross-linked polydimethylsiloxane; however, other cross-linked elastomers can also be employed, e.g., silicone, polymeric organosilicon, acrylics, butyl rubber, ethylene-vinyl acetate, natural rubber, nitriles, silicone rubber, styrene block copolymers, styrene-butadiene-styrene, styrene-ethylene/butylene-styrene, styrene-ethylene/propylene, styrene-isoprene-styrene, vinyl ethers, acrylate copolymer, a mono-acrylate oligomers, polyamide, and polyurethane. In some embodiments, the elastic layer includes the same or substantially the same types of elastomers as the visco-elastic layer. In some embodiments, the elastic layer includes one or more elastomer that is different from the elastomer or elastomers of the visco-elastic layer. In some embodiments, the ratio (w/w) of elastomer to cross-linking agent in the elastic layer is at least above 20:1 elastomer to cross-linker, e.g., about 15:1, 10:1, 9:1, 8:1, 7:1, 6:1, 5:1, 4:1, 3:1, 2:1, or 1:1 including any range above any one of the preceding values and any range between any two of the preceding values. In some embodiments, the percent of crosslinker used in the elastic layer is more than 10%, e.g., 11, 12, 13, 14, 15, 20, 30, 40, or 50% or more, including any range between any two of the preceding values and any range beneath any one of the preceding values.

In some embodiments, the type of elastomer within the elastic layer is the same. In some embodiments, more than one type of elastomer can be present within the elastic layer (e.g., 2, 3, 4, 5, 10 or more types of elastomer). In some embodiments, the type of elastomer within the visco-elastic layer is the same, in some embodiments, more than one type of elastomer can be present within the visco-elastic layer (e.g., 2, 3, 4, 5, 10 or more types of elastomer).

In some embodiments, the visco-elastic layer includes a weakly or partially cross-linked elastomer of at least one of silicone, rubber elastomer, acrylate copolymer, mono-acrylate oligomer, multi acrylate oligomer, styrene-butadiene-styrene, styrene-ethylene/butylene-styrene, styrene-ethylene/propylene, styrene-isoprene-styrene, or vinyl ether. In some embodiments, the cross-linking agent for the visco-elastic layer includes at least one of methylhydrogen-siloxane, benzoyl peroxide, bis-aziridines, multi-functional isocyanate, multiacrylate, or copolymerizable aromatic ketone monomer. In some embodiments, the elastic layer includes a second more fully cross-linked elastomer of at least one of: silicone, rubber elastomer, acrylate copolymer, mono-acrylate oligomer, multi acrylate oligomer, styrene-butadiene-styrene, styrene-ethylene/butylene-styrene, styrene-ethylene/propylene, styrene-isoprene-styrene, or vinyl ethers with high cross-linking percentage and low tackiness.

In some embodiments, the visco-elastic layer is any layer that, relative to the elastic layer, dissipates more force when stretched. In some embodiments, the elastic layer is any layer that, relative to the visco-elastic layer, dissipates less force when stretched. In some embodiments, the visco-elastic layer is any layer that has a higher adhesive strength than the elastic layer. In some embodiments, the elastic layer is any layer that has a lower adhesive strength than the visco-elastic layer. In some embodiments, an elastic layer has a storage modulus that is higher than the loss modulus, which indicates it to be a nearly frequency-independent elastic solid. In some embodiments, in a visco-elastic layer, the storage and loss moduli become comparable at a moderate frequency which signifies visco-elastic nature of the layer.

As noted above, and as demonstrated in the examples below, some embodiments of the pressure-sensitive adhesive provided herein not only can have a desired adhesive strength, but, in some embodiments, the pressure sensitive adhesive material has an adhesive strength that is able to be retained (or at least retained to a greater extent), than traditional visco-elastic based PSA's. Initially, of course, the composite pressure sensitive adhesive material can have a relatively high and/or desired adhesive strength when the adhesive surface is first placed onto a target surface (e.g., when the adhesive surface had not previously been used and/or had previously been protected by a packaging material, for example a backing sheet or a non-adhesive surface of a roll of tape. However, in some embodiments, the composite pressure sensitive adhesive material can have an adhesive strength similar to its initial adhesive strength, even after it has been used. In some embodiments, the composite PSA's is such that a second and/or subsequent use of the composite PSA still provides an adhesive strength of at least about 100 mJ/m$^2$, 800, 1000, 1200, 1400, 1500, 1600, 1700, 1800, 1900, 2000, 2100, 2200, 2400, 2600, 2800, 3000, or 4000, or 30,000 mJ/m$^2$, including any ranges above any one of the preceding values or between any two of the preceding values. In some embodiments, the composite PSA's is such that a second and/or subsequent use of the composite PSA still provides an adhesive strength of at least about 30%, 40%, 50%, 60%, 70%, 80%, 90% or higher of its initial value in the first use. In some embodiments, these strengths are provided once the adhesive surface has undergone cleaning, or other anti-fouling treatment.

As noted above, in some embodiments, the adhesive surface of the pressure sensitive material maintains an elevated adhesive strength after one or more cycle of adhesion and debonding. In some embodiments, a cycle of adhesion and debonding includes adhering the adhesive surface to a target surface, and then debonding the adhesive surface from the target surface. In some embodiments, the target surface is a non-adhesive surface. In some embodiments, when multiple cycles of adhesion and debonding are performed, the same target surface (e.g. a first surface) is used for each cycle. In some embodiments, when multiple cycles of adhesion and debonding are performed, two or more different target surfaces are used (e.g. a first surface and a second surface). In some embodiments, at least two of the two or more target surfaces are the same. In some embodiments, a cycle of adhesion and debonding includes washing, cleaning, and/or providing other anti-fouling treatment to the adhesive surface. In some embodiments, the adhesive surface has a desired adhesive strength after undergoing one or more cycles of adhesion and debonding, and each cycle includes a washing, cleaning, or anti-fouling step. In some embodiments, one or more, but not all, of the multiple cycles of adhesion and debonding include a washing, cleaning, or anti-fouling step. In some embodiments, none of the multiple cycles of adhesion and debonding include a washing, cleaning or anti-fouling step. In some embodiments, the adhesive surface has a high adhesive strength after undergoing 1, 2, 3, 5, 10, 13, 15, 17, 20, or more cycles of adhesion and debonding, including any ranges above or between any two of the state values. In some embodiments, the adhesive surface has an adhesive strength following 15 cycles of adhesion and debonding, and the adhesive strength is at least about 400 mJ/m$^2$, 800, 1000, 1200, 1400, 1500, 1600, 1700, 1800, 1900, 2000, 2100, 2200, 2300, 2400, 2600, 2800, 3000, or 4000 mJ/m$^2$, including any range above any one of the preceding values or between any two of the preceding values. In some embodiments, the adhesive surface has an adhesive strength following 15 cycles of adhesion and debonding that is at least about 50% of its initial adhesive strength, e.g., about 55, 60, 65, 70, 75, 80, 85, 90, 95, 96, 97, 98, 99, or 100% of the adhesive strength of the adhesion surface in the first cycle, including any range above any one of the preceding values and any range between any two of the preceding values.

In some embodiments, the composite pressure-sensitive adhesive provides for a single adhesive surface. In some embodiments, the composite PSA provides for at least two adhesive surfaces (e.g., double sided tape). In some embodiments, two or more surfaces of the pressure-sensitive adhesive material have a substantially similar adhesive strength. In some embodiments, at least one surface of the pressure-sensitive adhesive material has a greater adhesive strength than the other surface or surfaces.

Methods of Making

In some embodiments, a method of making a pressure-sensitive adhesive material is provided. In some embodiments, the method includes providing a visco-elastic layer. In some embodiments, the method includes applying an elastic layer over a surface of the visco-elastic layer. In some embodiments, the method includes curing the visco-elastic layer and the elastic layer one by one to thereby make a pressure-sensitive adhesive material. In some embodiments, viscoelastic layer is sandwich between two elastic layers for making double sided PSA's products. In some embodiments, curing can include UV radiation, solvent evaporation, and/or moisture treatment.

Figure 2:
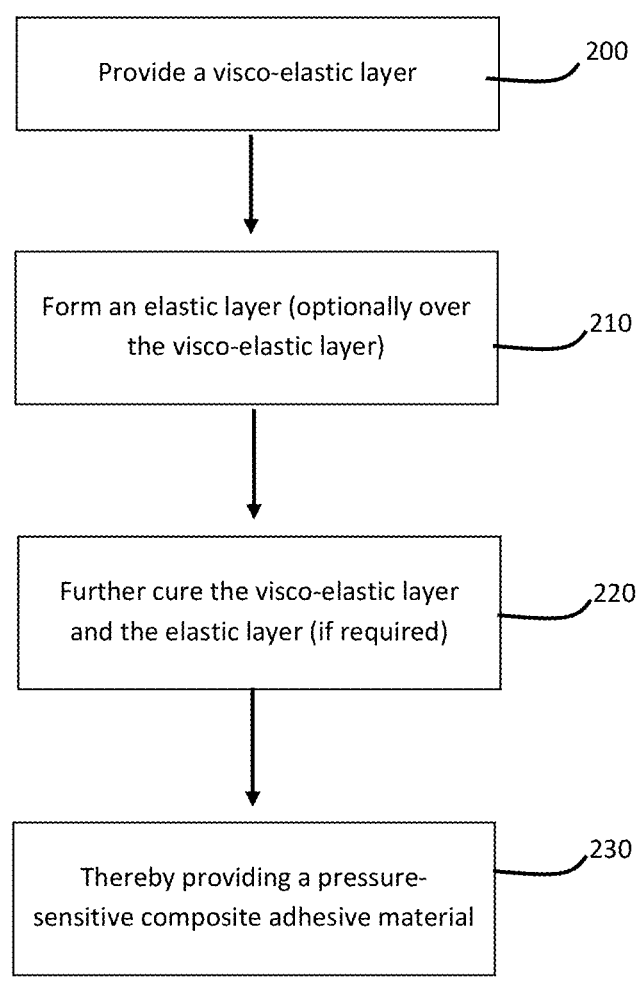
FIG. 2 is a flow chart depicting some embodiments a method of making a pressure-sensitive adhesive material.

FIG. 2 illustrates some embodiments of making a pressure-sensitive adhesive material. In some embodiments, a visco-elastic layer is provided (block 200). In some embodiments, the visco-elastic layer can be either free standing or on a substrate that is rigid and/or flexible. In some embodiments, an elastic layer is applied over a surface of the visco-elastic layer (block 210). In some embodiments, the visco-elastic layer and the elastic layer are cured (block 220), thereby providing a pressure-sensitive adhesive material (block 230).

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 3A:
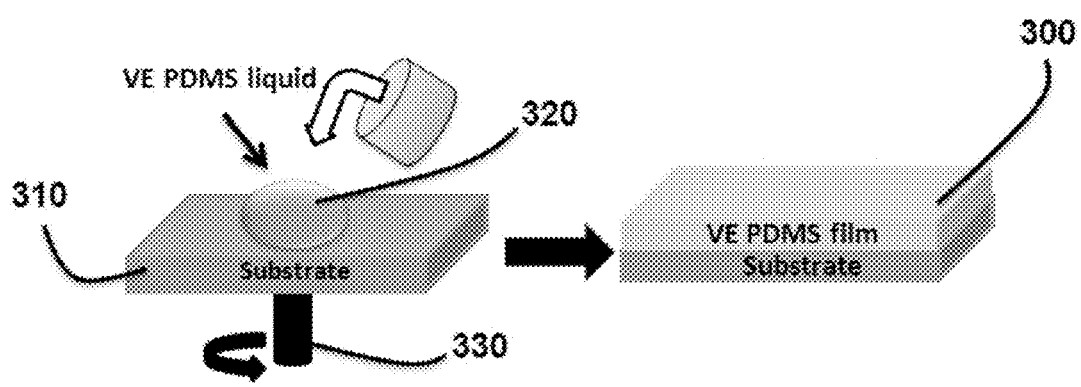
FIGS. 3A and 3B are drawings depicting some embodiments of a method of making a pressure-sensitive adhesive material.
Figure 3B:
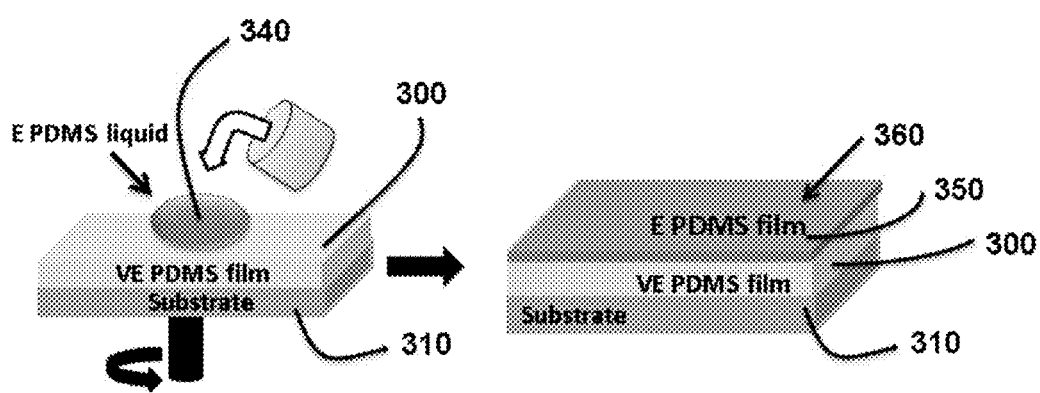

FIGS. 3A and 3B illustrate some embodiments of a method of making a pressure-sensitive adhesive material. In some embodiments, a substrate 310 is provided. In some embodiments, the substrate can be a paper sheet, a metal foil, a flexible laminate, and/or a fabric web. In some embodiments, the selected substrate 310 is contacted with a pre-polymer visco-elastic gel 320. In some embodiments, the selected substrate and pre-polymer visco-elastic gel 320 are spun on a spinning apparatus 330. In some embodiments, coating process could be wire wound coating, knife over role, reverse roll. In some embodiments, the pre-polymer visco-elastic gel is cured to form a visco-elastic layer 300.

In some embodiments, the visco-elastic layer 300 is contacted with a pre-polymer elastic gel 340. In some embodiments, the substrate 310, visco-elastic layer 300, and pre-polymer elastic gel are spun on the spinning apparatus 330. In some embodiments, the pre-polymer elastic gel 340 is cured to form the elastic layer 350, to thereby form a pressure-sensitive adhesive material 360.

In some embodiments, providing the visco-elastic layer includes providing substrate 310. In some embodiments, the substrate includes a substantially flat surface. In some embodiments, the substrate is operationally connected to a spinning apparatus 330. In some embodiments, a pre-polymer visco-elastic gel 320 is provided. In some embodiments, the pre-polymer visco-elastic gel is viscous. In some embodiments, the pre-polymer visco-elastic gel is substantially a liquid.

In some embodiments, the pre-polymer visco-elastic gel includes a cross-linking agent. In some embodiments, the ratio (w/w) of elastomer to cross-linking agent in the pre-polymer visco-elastic gel is about 20:1 or less, e.g., 400:1, 300:1, 200:1, 100:1, 70:1, 60:1, or 50:1, including a range between any two of the preceding values and any range beneath any one of the preceding values.

In some embodiments, the pre-polymer visco-elastic gel is applied to a substantially flat surface. In some embodiments, the pre-polymer visco-elastic gel is substantially evenly spread over the selected substrate 310, therefore providing a pre-polymer visco-elastic gel coating.

In some embodiments, applying the elastic layer includes providing a pre-polymer elastic gel 340. In some embodiments, the pre-polymer elastic gel is viscous. In some embodiments, the pre-polymer elastic gel is substantially a liquid. In some embodiments, the pre-polymer elastic gel includes an elastomer.

In some embodiments, the pre-polymer elastic gel includes a cross-linking agent. In some embodiments, the ratio (w/w) of elastomer to cross-linking agent in the elastic layer is at least about 20:1 elastomer to cross-linker, e.g., about 9:1, 8:1, 7:1, 6:1, 5:1, 4:1, 3:1, 2:1, 1:1, or 100:15 including any ranges between any two of the preceding values and any range above any one of the preceding values. In some embodiments, the pre-polymer elastic gel 340 is placed on a surface of the visco-elastic layer 300. In some embodiments, the pre-polymer elastic gel 340 is placed on a surface of the visco-elastic layer distal to the substrate 310. In some embodiments, the pre-polymer elastic gel 340, visco-elastic layer 300, substrate 310 are spun by the spinning apparatus 330. In some embodiments, the substrate 310 and pre-polymer elastic gel 340 are spun by a different spinning apparatus than the spinning apparatus used to spin the substrate and pre-polymer visco-elastic gel. In some embodiments, the pre-polymer visco-elastic gel is substantially evenly spread over the substrate 310, therefore forming a pre-polymer visco-elastic gel spin coat. In some embodiments, the layers (VE and E) are made separately and are combined in any of a variety of ways (e.g., solvent treatment, heat treatment, chemical treatment, and/or an extra contacting coating to keep the layers together.)

In some embodiments, the percent of crosslinker combined with the polymer is less than 2%, e.g., 1.9, 1.8, 1.7, 1.6, 1.5, 1.4, 1.3, 1.2, 1.1, 1, 0.9, 0.8, 0.7, 0.6, 0.5, 0.4, 0.3, 0.2, 0.1, or less, including any range between any two of the preceding values and any range beneath any one of the preceding values.

In some embodiments, the percent of crosslinker combined with the elastomer in the elastic layer is more than 2%, e.g., 11, 12, 13, 14, 15, 20, 30, 40, 50% or more, including any range between any two of the preceding values and any range beneath any one of the preceding values.

In some embodiments, the pre-polymer visco-elastic gel has a substantially uniform thickness after spinning. In some embodiments, the pre-polymer visco-elastic gel has a thickness of at least about 1 micrometers, 2, 4, 8, 20, 30, 40, 100, 150, 200, 250, 300, 350, 370, 390, 400, 410, 420, 430, 440, 460, 480, 500, 510, 520, 530, 540, 560, 600, 700, 800, 900, 1000 or more micrometers, including a range above any one of the preceding values and a range between any two of the preceding values.

In some embodiments, the pre-polymer elastic gel includes a greater percentage of cross-linker by weight than the pre-polymer visco-elastic gel. Thus, in some embodiments, more cross-linker can be added to the pre-polymer gel for the elastic layer than for the visco-elastic layer.

In some embodiments, the pre-polymer elastic gel has a substantially uniform thickness after spinning. In some embodiments, the pre-polymer elastic gel has a thickness of about 0.5 micrometers, e.g., 1, 2, 3, 4, 5, 6, 8, 10, 12, 14, 18, 20, 25, 30, 35, 40, 50, 60, 70, 90, 100, 120, or 500 micrometers, including any ranges below or between any two of the preceding values.

In some embodiments, a skin layer (E) that is thinner than the bulk layer (VE) layer, gives composite strength approaching the strength of the VE layer alone. An E layer thicker than about $\frac{1}{4}^{th}$ of the VE layer thickness gives a low adhesive strength approaching the strength of V layer alone.

In some embodiments, the pre-polymer visco-elastic gel is cured. In some embodiments, the pre-polymer elastic gel is cured. In some embodiments the layer are cured sequentially. In some embodiments, the visco-elastic layer is completely cured before the elastic layer is applied. In some embodiments, the visco-elastic layer is adequately cured to allow application of an additional layer on top of it.

In some embodiments, the gel (visco-elastic and/or elastic) is cured for a duration of about 1, 2, 3, 4, 5, 6, 7, 8, 9, 10, 11, 12, 18, 24, 36, 42, 48, 54, 60, or 72 hours, including any between any two of the preceding values. Other times are also contemplated, depending upon other appreciated variables in the system. In some embodiments, the gel (visco-elastic and/or elastic) is cured at a temperature of at least about 27 degrees Centigrade, for example, 25, 30, 35, 40, 50, 60, 70, 80, 83, 85, 87, 90, 100, 110, or 120° C., including any ranges between any two of the preceding values. In some embodiments, the material can be cured under various conditions such as UV light, rapid heating, moisture treatment, and catalytic activation by adding precursors. Other temperatures are also contemplated, depending upon other appreciated variables in the system.

In some embodiments, the pre-polymer visco-elastic gel is cured for 48 hours. In some embodiments, the pre-polymer visco-elastic gel is cured at 85° C. In some embodiments, the pre-polymer elastic gel is cured for 48 hours. In some embodiments, the pre-polymer elastic gel is cured at 85° C.

Method of Using a Pressure-Sensitive Adhesive Material

In some embodiments, a method of using a pressure-sensitive adhesive material is provided. In some embodiments, the method includes providing a pressure-sensitive adhesive material. In some embodiments, the method includes adhering an adhesive surface of the pressure-sensitive adhesive material to a target surface. In some embodiments, the method includes detaching the adhesive surface from the target surface. In some embodiments, the adhesive surface is then adhered to a target surface (which can be the same or a different target surface).

In some embodiments, the method of using a pressure-sensitive adhesive material includes providing a pressure-sensitive adhesive material (e.g., one as described herein). In some embodiments, the pressure-sensitive adhesive material can include a visco-elastic layer and an elastic layer. In some embodiments, the pressure-sensitive adhesive material has an adhesive surface. In some embodiments, the method includes adhering the adhesive surface to a first surface. In some embodiments, pressure is applied to adhere the adhesive surface to the first surface. In some embodiments, the adhesive surface is detached from the first surface. In some embodiments, lifting, pulling, peeling, or prying is used to detach the adhesive surface from the first surface. In some embodiments, detaching the adhesive surface from the first surface includes debonding the adhesive surface from the target surface. In some embodiments, after detachment from the first surface, the adhesive surface is adhered to a second surface.

In some embodiments, the second surface is the same as the first surface. In some embodiments, the second surface overlaps with the first surface. In some embodiments, the second surface is physically connected to the first surface, but does not overlap. In some embodiments, there is no physical connection between the second surface and the first surface.

In some embodiments, the adhesive surface adheres to the first surface with a first adhesion strength. In some embodiments, the adhesion strength is at least about 100 mJ/m$^2$, e.g., 200, 300, 400, 500, 600, 700, 800, 900, 1000, 1100, 1200, 1300, 1400, 1500, 1600, 1700, 1800, 1900, 2000, 2100, 2200, 2400, 2600, 2800, 3000, 4000, 6000, 9000, 15000, 20000, or 30000 mJ/m$^2$, including any range above any one of the preceding values and any range between any two of the preceding values.

In some embodiments, the adhesive surface adheres to the second surface with an adhesion strength. In some embodiments, the adhesion strength is similar to that of the first adhesion strength. In some embodiments, the adhesion strength to the second surface is at least about 400 mJ/m$^2$, e.g., 400, 500, 600, 700, 800, 900, 1000, 1100, 1200, 1300, 1400, 1500, 1600, 1700, 1800, 1900, 2000, 2100, 2200, 2400, 2600, 2800, 3000, or 4000 mJ/m$^2$, including any range above any one of the preceding values and any range between any two of the preceding values.

In some embodiments, multiple cycles of adhering and detaching the adhesive surface are performed. In some embodiments, 2, 3, 4, 5, 7, 10, 12, 15, 18, 20, 25, 30, 35, or 40 cycles of adhering and detaching the adhesive surface are performed, including any range above any one of the preceding values or between any two of the stated values.

In some embodiments, at least one of the multiple cycles includes adhering the adhesive surface to the first surface. In some embodiments, at least one of the cycles includes adhering the adhesive surface to a surface other than the first surface. In some embodiments, at least one of the cycles includes adhering the adhesive surface to two or more surfaces that are not the first surface. In some embodiments, at least one of the cycles includes adhering the adhesive surface to a portion of the first surface and at least one surface that is not the first surface. As additional cycles are performed, the adhesive surface can adhere to 1, 2, 3, 4, 5, 7, 10, 12, 15, 20, 25, 30, or 40 additional surfaces that are not the first surface, including any range above any one of the preceding values and any range between any two of the stated values. In some embodiments, any two additional surfaces can overlap, can be physically connected but not overlap, and/or may not be physically connected at all.

In some embodiments, the adhesive surface is cleaned after detaching the adhesive surface from the first surface. In some embodiments, the adhesive surface is cleaned prior to adhering the adhesive surface to a second (or subsequent) surface. In some embodiments, the adhesive surface is cleaned by contacting the adhesive surface with adhesive tape. In some embodiments, the adhesive surface is cleaned by applying a jet of air to the adhesive surface. In some embodiments, the adhesive surface is cleaned by water spraying. In some embodiments, PSA surfaces are cleaned by applying and peeling another sticky surfaces to remove the surface contaminants. In some embodiments, a combination two or more cleaning methods is used to clean the adhesive surface.

In some embodiments, 5 or more cycles of adhesion and detaching are performed, e.g., 5, 10, 15, 20, 25, 30, 35, 40, 45, 50, 55, 60, 80, 100, or more. In some embodiments, after the adhesion step in any one of the cycles listed above (e.g., 5, 10, 15, 20, 25, 30, 35, 40, 45, 50, 55, 60, 80, or 100), the adhesive surface adheres to the next surface with an adhesion strength of at least about 400 mJ/m$^2$, e.g., 500, 600, 700, 800, 900, 1000, 1100, 1200, 1400, 1600, 1800, 1900, 2000, 2100, 2200, 2300, 2400, 2500, 2600, 2700, 2800, 3000, 3500, or 4000 mJ/m$^2$, including any range above any one of the preceding values and any range between any two of the preceding values. In some embodiments, following the adhesion step in the cycle, an additional detaching step is performed. In some embodiments, one or more additional cycles are performed following the cycle (e.g., the 15$^{th}$ cycle).

In some embodiments, 5 or more cycles of adhesion and detaching are performed, e.g., 5, 10, 15, 20, 25, 30, 35, 40, 45, 50, 55, 60, 80, 100, or more. In some embodiments, after the adhesion step in the cycle (e.g., cycle 5, 10, 15, 20, 25, 30, 35, 40, 45, 50, 55, 60, 80, or 100), the adhesive surface has an adhesive strength that is at least about 50% of the initial adhesion strength, e.g., 55, 60, 65, 70, 75, 80, 85, 90, 95, 96, 97, 98, 99, or 100% of the adhesive, including any range above any of the preceding values and any range between any two of the preceding values. In some embodiments, these adhesion values follow one or more of the noted cleaning processes provided herein.

Additional Embodiments

It is herein appreciated that reuse of pressure sensitive can be limited by structural changes, such as cohesive failure of the adhesive layer which causes fouling of the surface. It also greatly diminishes the adhesiveness of adhesion with each use. Visco-plasticity or tackiness of a traditional pressure sensitive adhesive gives it strength owing to energy dissipation during peeling. However, it also renders it non-reusable because of structural changes such as the formation of fibrils, cohesive failure and fouling. In contrast, an elastic layer has good structural integrity and cohesive strength and separates cleanly, but has low adhesive energy. As described herein (and shown in the accompanying examples) a combination of these characteristics is provides an ideal, re-usable, PSA which presents a non-fouling surface of good structural integrity combined with an adhesive strength similar to the visco-plastic adhesive.

In some embodiments, the pressure-sensitive adhesive has a high structural integrity of its elastic surface, allowing its clean separation, anti-fouling and reusability.

In some embodiments, a composite adhesive layer is provided and includes a soft visco-elastic or visco-plastic bulk layer (VE) covered by a thinner elastic layer (E) (or elastic thin-skin layer). In some embodiments, the material has superior structural integrity, reusability and properties to the VE material and superior adhesive properties to the E material. For the elastic layer, the adhesion strength of the composite layer can be comparable to that of the viscoelastic material. However, in some embodiments, the composite layer demonstrates clean separation without leaving a residue, reusability and anti-fouling characteristics similar to the elastic material of the skin.

As shown in the examples below, the composite set-up has been demonstrated for a model adhesive, polydimethylsiloxane polymer, where its bulk core and skin are created by 2% and 10% cross-linking percentage. However, composites of other visco-elastic (core) and elastic (skin) materials will also yield varying combinations of viscoelasticity and reusability properties. The concept of a core viscoelastic polymer of high adhesive strength covered by a thin skin of an elastic material to produce a re-usable adhesive is applicable to any combination of polymers including the polymers used in commercially available adhesives.

In some embodiments, the fouling nature of an adhesive can be tuned by a top elastic layer (e.g., which can be 10% cross linked PDMS). Because of the high elastic nature of top surface, it resists dirt and foreign molecules from sticking to the surface and keeps the surface clean for a long time. It can also be easier to clean than other adhesive surfaces, so as to allow one to reuse the adhesive again and again. Similarly, in some embodiments, the developed adhesives also show good peel strength because of the core viscoelastic layer which has higher peel resistive tendency to detach from adherent surface. The present quality/properties are deficient in currently-available adhesives such as pressure sensitive adhesives and many others.

Fabrication of layer by layer/multilayer adhesives needs extensive process parameters, such as chemical, physical and mechanical to form strong bond between layers. If these processes fail to do so, the bonding between layers will be weak and it will affect the adhesive performance negatively which includes weak adhesive bonding, non-uniform adhesives separation, low peeling stress etc. However, provided fabrication method shows a strong bond between layers without any further processing. For example, during the fabrication, strong bond formation takes place due to favorable surface tension of PDMS material and intermolecular chain diffusion between two PDMS layer (as confirmed by doing multiple peel test on same adhesive surface). The peel test results (below) show that after multiple peel runs, the bonding between layers remains as strong as before. While this has been demonstrated for PDMS, it is understood that it should work for other elastomers as well and indeed for any viscoelastic material that can be used as a PSA by its suitable bonding to an elastic skin.

EXAMPLES

Example 1

Peel Test

Figure 4:
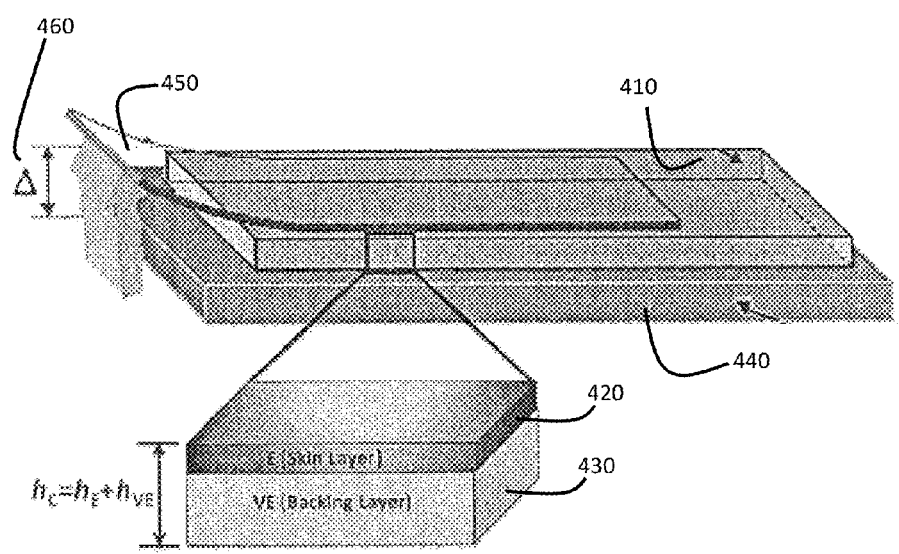
FIG. 4 is a drawing depicting some embodiments of a peel test.

The present example outlines a process for testing various aspects of various pressure sensitive adhesives. In this example, the peel test involved an attached flexible glass cover slip that was lifted vertically at a peeling speed of 100 µm/s by using a displacement control probe governed by a micromanipulator. This is illustrated in FIG. 4.

The test was used to measure the adhesive properties of the various composite materials. An adhesive material containing an elastic layer 420 and a visco-elastic layer 430 was positioned on a rigid substrate 440. A flexible glass coverslip (flexible plate) 450 of rigidity D=0.02 Nm was attached to the adhesive film. $h_C$, $h_E$ and $h_{VE}$ represent the thicknesses of the composite 410, elastic 420 and visco-elastic 430 layers respectively and Δ 460 represents the displacement of the cover slip.

Figure 5A:
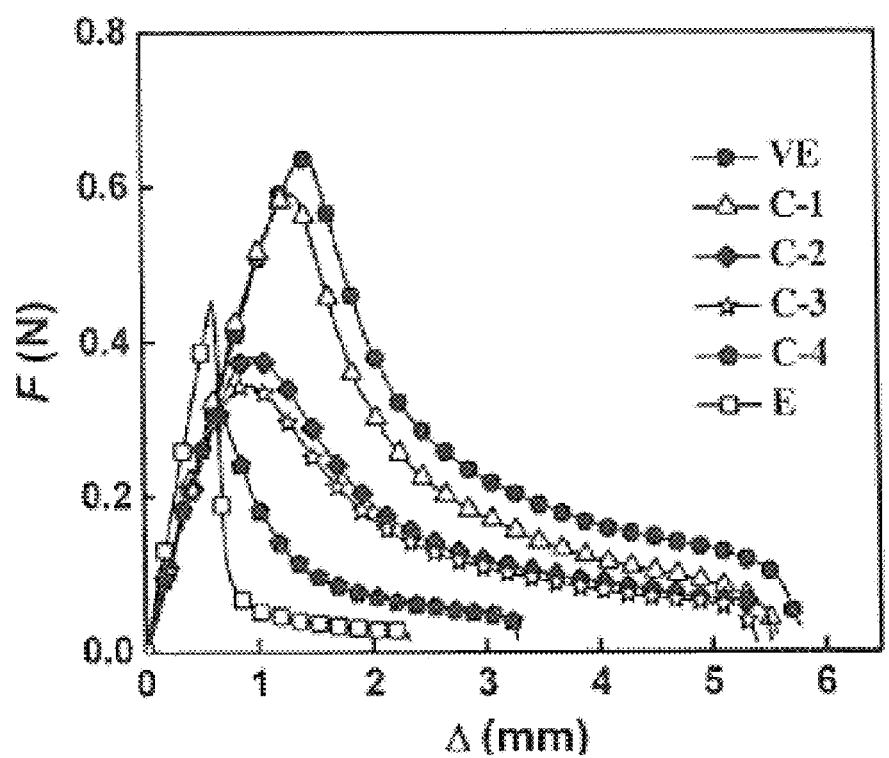
FIG. 5A is a graph depicting some results regarding force-displacement (F-Δ) curves from the peel test.
Figure 6:
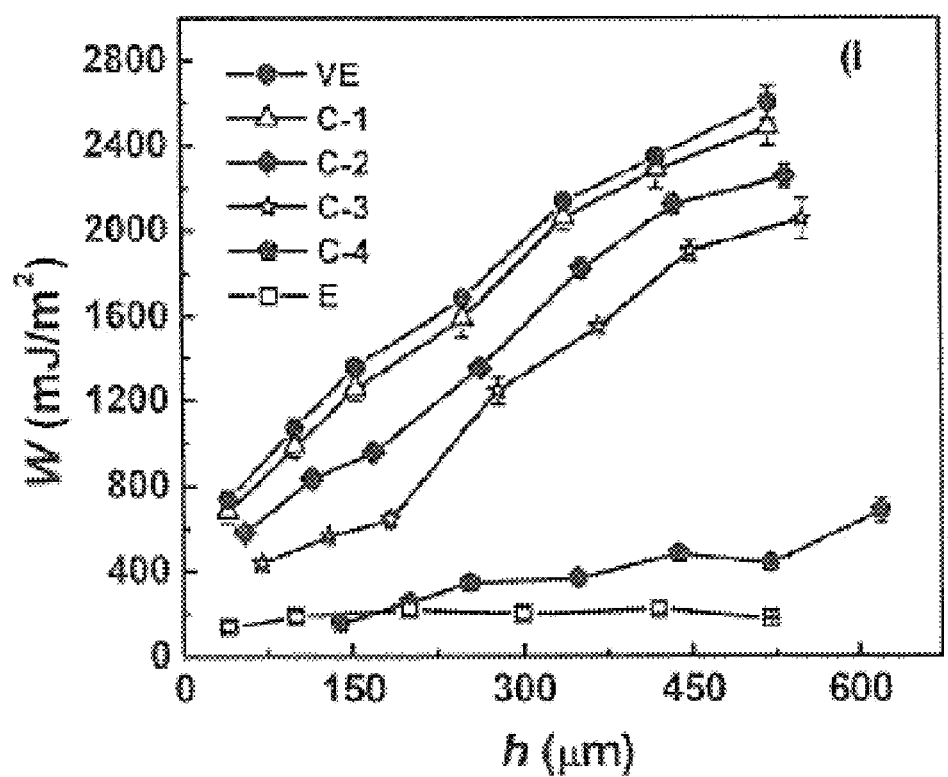
FIG. 6 is a graph depicting some results regarding the relationship of adhesion energy with layer-thickness.

The results of various force-displacement tests for various composite materials (C-1, C-2, and C-3) and for a pure elastic layer (E) and pure visco-elastic layer (VE) are shown in Tables 1 and 2 and FIGS. 5A and 6.

As shown in FIG. 5A (compositions listed in Table 1), the adhesion energy for the composite pressure-sensitive adhesive materials shows a hybrid behavior that varies based upon the thickness of the elastic skin layer in the composite.

TABLE 1

| Material | Viscoelastic Layer (Thickness in μm) | Elastic Layer (Thickness in μm) |
|---|---|---|
| VE | 420 | |
| C-1 | 420 | 2 |
| C-2 | 420 | 15 |
| C-3 | 420 | 30 |
| C-4 | 420 | 100 |
| E | | 420 |

For a very thin elastic skin layer ($h_E$=2 μm) the adhesion energy is nearly identical to that of corresponding single viscoelastic layer. A greater penetration of the stress-field in the viscoelastic core during peeling allows a greater arresting effect for the crack, owing to greater viscous dissipations. A thick (>100 μm) elastic skin however completely shields the viscoelastic core from the stresses and the adhesion strength falls to closer to the range of single elastic layer (e.g., C-4 vs. E in FIG. 5A).

Figure 5B:
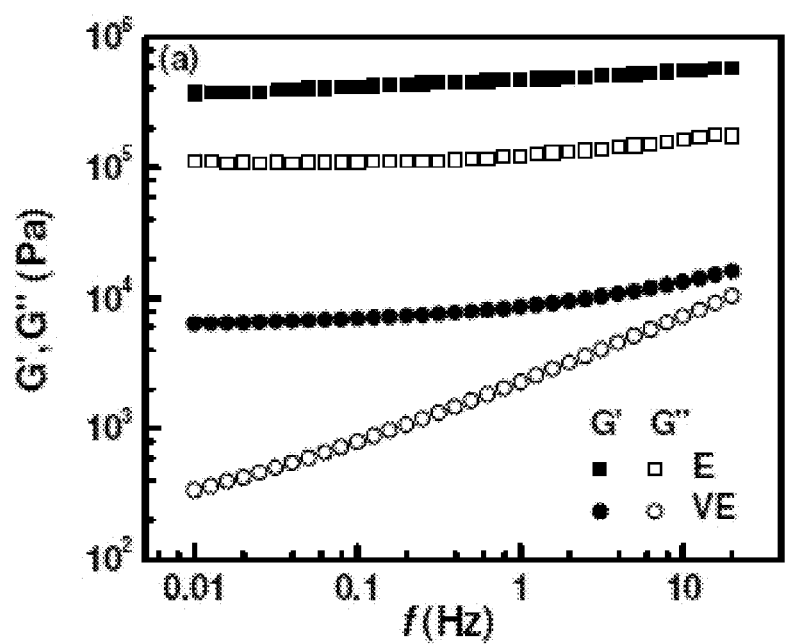
FIG. 5B is a graph depicting results regarding storage, G', and loss, G", moduli.
Figure 5C:
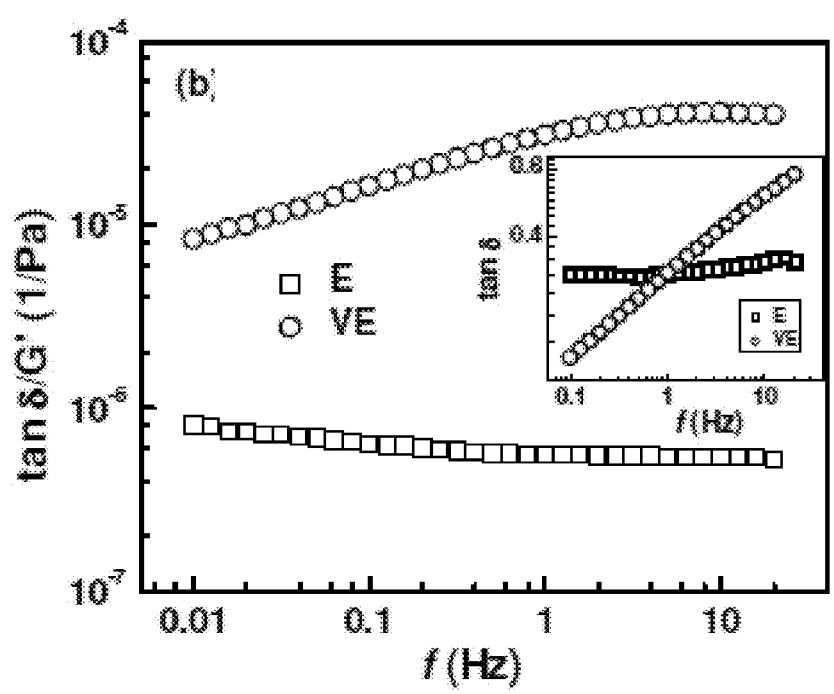
FIG. 5C is a graph depicting results regarding tan δ/G' for the elastic (E) and visco-elastic (VE) PDMS used and inset shows behavior of tan δ as function of frequency.

FIGS. 5B and 5C show the rheology responses for elastic and viscoelastic PDMS used in this Example. From FIG. 5B, the storage, G'(f) and loss, G"(f) moduli for used PDMS systems can be observed. For elastic (10% cross link) PDMS the storage modulus was higher than the loss modulus, indicating a nearly frequency independent elastic-solid. For the visco-elastic (2% cross link) PDMS, the storage and loss moduli became comparable at a moderate frequency. There was nearly one order of magnitude difference in the storage moduli and two orders of magnitude in the loss moduli of the two PDMS layers. The ratio G"/G', which is called the loss tangent, tan δ, is high (>>1) for the materials that are visco-elastic liquidlike, but is low (<<1) for materials that are solid-like. Further, tan δ/G', as shown in FIG. 5C, is indicative of the viscous dissipation, which also controls the crack propagation speed. The viscous dissipation is controlled by the 2% crosslinked PDMS layer. The higher value of tan δ/G' for the visco-elastic layer corresponded to a higher displacement of the adhesive layer before failure which was manifested by higher peak and slower crack propagation compared to the elastic layer. The composite layers, C-1 to C-4 ($h_E$=2, 15, 30 and 100 μm) showed an intermediate behavior (FIG. 5A). However, the elastic layer thickness has a prominent effect.

Figure 5D:
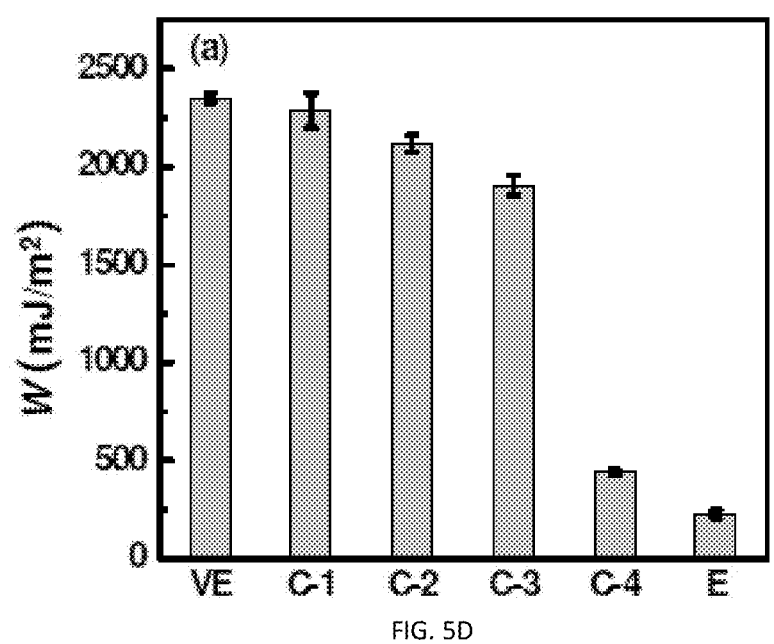
FIG. 5D is a graph depicting results regarding adhesion strength of viscoelastic (VE), composite (C-1 to C-4) and elastic (E) layers. Composite layers C-1 to C-4 have elastic skin layer thickness of 2, 15, 30 and 100 µm, respectively. The thickness of the single layers and the core layer are 420 µm.

As the elastic layer thickness increased, the composite performance became increasingly similar to that of the elastic film. While the adhesive behavior of composite C-1 with the thinnest elastic skin was almost identical to that of the single viscoelastic film with unshielded surface, composite C-4 closely approached a single elastic layer. The decay of force for composite films paralleled the visco-elastic case signifying the control of detachment by dissipation in the buried visco-elastic layer, notwithstanding the presence of the elastic skin. The higher peak forces and their slower decay are also reflected in the higher adhesion strength or the work of adhesion as shown in FIG. 5D. The estimated adhesion strength for a single elastic and viscoelastic layers was W=180 mJ/m$^2$ and W=2350 mJ/m$^2$, respectively (both for 420 μm thick films). The adhesion strength shown is only for the crack-propagation part of the F-Δ curve. However, as is clear from FIG. 5A, the crack-initiation strength (area from zero to the maximum force) is also significantly higher for the composite adhesive. The adhesion strength for the composite layers showed an intermediate behavior depending on its skin thickness. At very thin elastic layer ($h_E$=2 μm), the adhesion strength is nearly identical to that of corresponding single visco-elastic layer. A greater penetration of the stress-field in the visco-elastic core during peeling allowed a greater arresting effect for the crack owing to greater viscous dissipation. A thick (e.g., >100 μm) elastic layer however shielded the viscoelastic core from the stresses and the adhesion strength falls to its value for a single elastic layer.

The adhesion energy results for the composites are compared with the single elastic and viscoelastic layers in FIG. 6, involving the compositions in Table 2.

TABLE 2

| Material | Viscoelastic Layer (Thickness in μm) | Elastic Layer (Thickness in μm) |
|---|---|---|
| VE | 40-520 | |
| C-1 | 40-520 | 2 |
| C-2 | 40-520 | 15 |
| C-3 | 40-520 | 30 |
| C-4 | 40-520 | 100 |
| E | | 420 |

The graph reveals that for a single visco-elastic layer, the adhesion energy shows strong thickness dependence, and for a single elastic layer, the adhesion energy shows weak thickness dependence.

Example 2

Reusability Test

Figure 7:
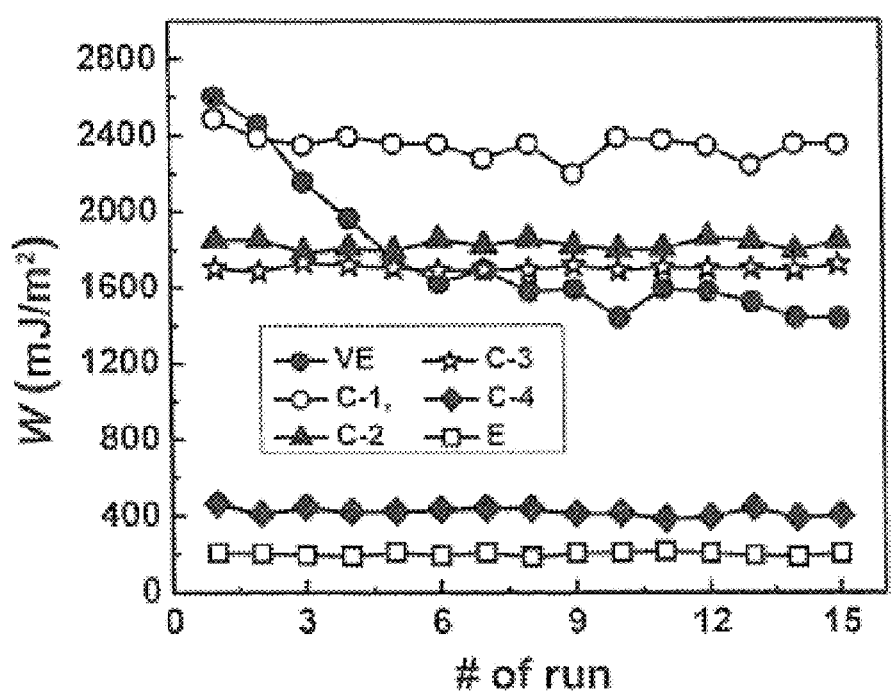
FIG. 7 is a graph depicting some results regarding the variation of adhesion energy after a number of adhesion-debonding cycles without any cohesive failure or fouling.

The present example examined the reusability of the composite materials vs. pure elastic layers or viscoelastic layers. Reusability can be demonstrated by measuring adhesive strength after numerous adhesion and debonding cycles. The results of these tests are shown in FIG. 7, involving the composition in Table 3.

TABLE 3

| Material | Viscoelastic Layer (Thickness in μm) | Elastic Layer (Thickness in μm) |
|---|---|---|
| VE | 420 | |
| C-1 | 420 | 2 |
| C-2 | 420 | 15 |
| C-3 | 420 | 30 |
| C-4 | 420 | 100 |
| E | | 420 |

The elastic adhesive films as well as the composites that include a thin elastic layer showed no substantial change in their adhesive strengths after repeated use. The visco-elastic film shows a decrease in adhesion strength following repeated cycles of adhesion and debonding. For example, the adhesion strength of the visco-elastic (VE) material decreased from about 2600 mJ/m$^2$ in the first cycle, to under 2200 mJ/m$^2$ in the third cycle, and to under 1600 mJ/m$^2$ in the fifteenth cycle. In contrast, the composite adhesive material (C-1), which includes a 420 µm visco-elastic layer and 2 µm elastic layer retains an adhesion strength of about 2400 mJ/m$^2$ for the first through the fifteenth cycles.

Example 3

Anti-Fouling Test

Figure 8:
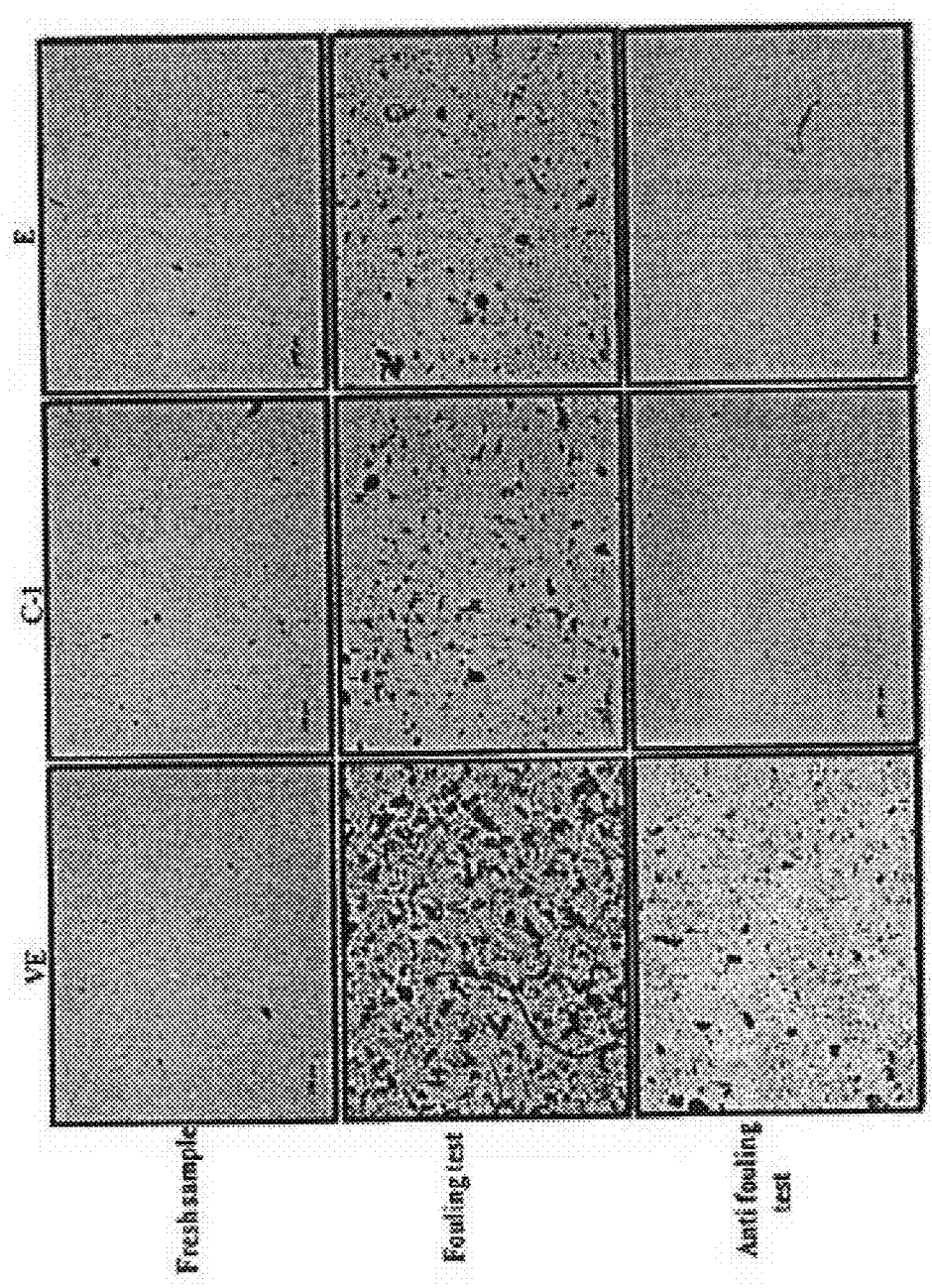
FIG. 8 is a series of optical micrographs of surfaces of various embodiments provided herein after a fouling test for the viscoelastic (VE), composite (C-1) and elastic (E) surfaces.

An anti-fouling test was performed on visco-elastic (VE), composite (C-1) and elastic (E) surfaces. First fresh, clean adhesive surfaces ("fresh sample") were provided and observed and documented via a micrograph. Then the surfaces were fouled by applying dust on PSAs surfaces and the surfaces were cleaned by controlled air spraying. The dust particles attached to surface due to surface force and elastic force attraction (a "fouling test"). The resulting surfaces were then again observed and documented via a micrograph. Finally, an adhesive tape was then used to clean the various surfaces to assess the ease of surface cleaning ("anti-fouling test"). The resulting surfaces were then again observed and documented via a micrograph. As can be readily seen in the micrographs themselves (FIG. 8), the C-1 composite was superior to the VE material in both the fouling and anti fouling test, and appeared similar to if not the same as the elastic surface in both the fouling and anti fouling test.

Example 4

Adhesion Strength

Figure 9:
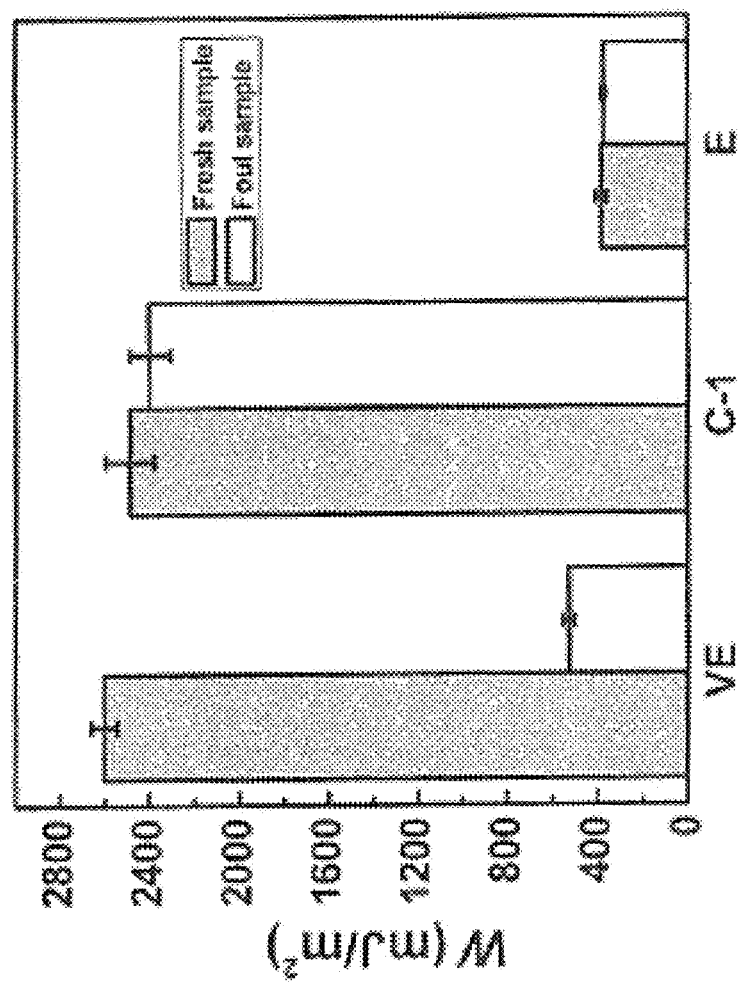
FIG. 9 is a bar chart depicting the results of adhesion energy measurements on fouled samples after cleansing with an air-jet and an adhesive tape.

The adhesion energy of fresh samples was compared to the adhesion energies of fouled samples (after cleansing with an air-jet and adhesive tape) for visco-elastic (VE), composite (C-1) and elastic (E) surfaces. The results of those adhesion energy measurements are illustrated in FIG. 9. A visco-elastic layer (VE) exhibited a substantial decrease in adhesion energy post-fouling compared to the fresh VE layer, decreasing in adhesion energy from about 2600 mJ/m$^2$ (fresh layer) to about 500 mJ/m$^2$ (fouled layer). A composite adhesive material (C-1), containing a 420 µm visco-elastic layer and 2 µm elastic layer exhibited little decrease in adhesion energy post-fouling compared to the fresh layer, decreasing in adhesion energy from about 2500 mJ/m$^2$ (fresh layer) to about 2400 mJ/m$^2$ (fouled layer). An elastic layer (E) exhibited consistently low adhesion energies post-fouling compared to the fresh layer, exhibiting an adhesion energy of about 400 mJ/m$^2$ in the fresh layer and about 400 mJ/m$^2$ in the fouled layer.

Example 5

Making a Pressure-Sensitive Adhesive Material

The present example outlines a method for making a composite pressure sensitive adhesive. This can occur in two processes.

Process 1: Preparation of visco-elastic (VE) layer (see generally FIG. 3A). A 2% pre-polymer (visco-elastic) gel spin-coat is placed on clean glass substrate with thickness of 40 to 520 µm and cured at 85° C. for 48 hours. The cross-linker was a methylhydrogen-siloxane cross linker.

Process 2: Preparation of elastic (E) layer (see generally FIG. 3B). After curing the viscoelastic layer, a 10% pre-polymer (elastic) gel spin-coat is placed on visco-elastic backing layer with thickness of 2 to 100 µm and cured at 85° C. for 48 hrs, thereby providing the composite pressure sensitive adhesive. The cross-linker was a methylhydrogen-siloxane cross linker.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A pressure-sensitive adhesive material, the material comprising:
   a visco-elastic layer including a weakly or partially cross-linked first elastomer;
   an elastic layer placed over the visco-elastic layer, the elastic layer including a second elastomer exhibiting a higher degree of cross-linking than first elastomer and a thickness that is less than one quarter of a thickness of the visco-elastic layer; and
   an adhesive surface on the elastic layer on a surface thereof opposite the visco-elastic layer, wherein the adhesive surface has an adhesive strength of at least 200 $mJ/m^2$.

2. The pressure-sensitive adhesive material of claim 1, wherein the elastic layer is adjacent and bonded to a surface of the visco-elastic layer.

3. The pressure-sensitive adhesive material of claim 1, wherein the visco-elastic layer comprises at least one of silicone, rubber elastomer, acrylate copolymer, mono-acrylate oligomer, multi acrylate oligomer, styrene-butadiene-styrene, styrene-ethylene/butylene-styrene, styrene-ethylene/propylene, styrene-isoprene-styrene, or vinyl ether.

4. The pressure-sensitive adhesive material of claim 3, wherein a cross-linking agent for the visco-elastic layer comprises at least one of methylhydrogen-siloxane, benzoyl peroxide, bis-aziridines, multi-functional isocyanate, multiacrylate, or copolymerizable aromatic ketone monomer.

5. The pressure-sensitive adhesive material of claim 3, wherein the elastic layer comprises at least one of silicone, rubber elastomer, acrylate copolymer, mono-acrylate oligomer, multi acrylate oligomer, styrene-butadiene-styrene, styrene-ethylene/butylene-styrene, styrene-ethylene/propylene, styrene-isoprene-styrene, or vinyl ethers with high crosslinking percentage and low tackiness.

6. The pressure-sensitive adhesive material of claim 1, wherein the adhesive surface of the pressure-sensitive adhesive material has the adhesive strength of at least 200 $mJ/m^2$ after at least 15 cycles of adhesion and debonding of a hydrophobic flexible glass surface.

7. The pressure-sensitive adhesive material of claim 6, wherein the adhesive surface of the pressure-sensitive adhesive material after 15 cycles of adhesion and debonding has the adhesive strength of at least 50% of an adhesive strength after a first cycle of adhesion and debonding.

8. The pressure-sensitive adhesive material of claim 1, wherein the visco-elastic layer is formed from a pre-polymer visco-elastic gel that comprises about 2% cross-linking percentage.

9. The pressure-sensitive adhesive material of claim 1, wherein the adhesive material adheres to a first surface with an adhesion strength of at least 2000 $mJ/m^2$.

10. The pressure-sensitive adhesive material of claim 1, wherein the adhesive material adheres to a second surface with an adhesion strength of at least 1900 $mJ/m^2$.

11. The pressure-sensitive adhesive material of claim 5, wherein the visco-elastic layer has a thickness of about 1 micrometers to about 1000 micrometers.

12. The pressure-sensitive adhesive material of claim 11, wherein the elastic layer has a thickness of about 1 micrometer to about 500 micrometers.

13. The pressure-sensitive adhesive material of claim 1, wherein the elastic layer has a thickness of 100 micrometers or less.

14. A method of making a pressure-sensitive adhesive material, the method comprising:
   providing a visco-elastic layer;
   applying an elastic layer over a surface of the visco-elastic layer, where the elastic layer has a thickness that is less than one quarter of a thickness of the visco-elastic layer; and
   curing the visco-elastic layer and the elastic layer, thereby making a pressure-sensitive adhesive material; wherein the cured elastic layer includes an adhesive surface on a surface thereof opposite the visco-elastic layer, wherein the adhesive surface has an adhesive strength of at least 200 $mJ/m^2$.

15. The method of claim 14, wherein providing the visco-elastic layer comprises:
   providing a substrate;
   contacting the substrate with a pre-polymer visco-elastic gel;
   spinning the substrate and the pre-polymer visco-elastic-gel, thereby forming a pre-polymer visco-elastic gel spin-coat; and curing the pre-polymer visco-elastic gel spin-coat, thereby preparing a visco-elastic layer.

16. The method of claim 15, wherein applying the elastic layer comprises:
  contacting the visco-elastic layer with a pre-polymer elastic gel;
  spinning the substrate, the visco-elastic layer, and the pre-polymer elastic gel; and
  curing the pre-polymer elastic gel, thereby applying the elastic layer.

17. A method of using a pressure-sensitive adhesive material, the method comprising:
  providing the pressure-sensitive adhesive material of claim 1;
  adhering the adhesive surface of the pressure-sensitive material to a first surface;
  detaching the adhesive surface from the first surface; and
  adhering the adhesive surface of the pressure-sensitive material to a second surface.

18. The method of claim 17, further comprising preforming at least three additional cycles of adhering and detaching the adhesive surface.

19. The method of claim 18, wherein at least one of the at least three additional cycles comprises adhering the adhesive surface to a surface other than the first surface.

20. The method of claim 17, wherein the second surface and the first surface are a same surface.

21. The method of claim 17, further comprising cleaning the adhesive surface after detaching the adhesive surface from the first surface.

22. The method of claim 21, wherein prior to adhering the adhesive surface to the second surface, the adhesive surface is contacted with an adhesive tape, thereby cleaning the adhesive surface.

23. The method of claim 21, wherein cleaning comprises a jet of air to blow the adhesive surface clean.

24. The method of claim 17, further comprising:
  detaching the adhesive surface from the second surface; and
  performing at least 13 additional cycles of adhering and detaching the adhesive surface to the second surface, so as to provide 15 total cycles of adhesion and detaching, wherein the adhesive surface adheres to the second surface at the $15^{th}$ cycle with an adhesion strength of at least about 1400 mJ/m$^2$.

25. The method of claim 24, wherein the adhesive surface adheres to the second surface at a $15^{th}$ cycle with an adhesion strength of at least about 70% of an adhesion strength that the adhesive surface adhered to the first surface on a first cycle.

26. The method of claim 24, wherein the adhesive surface adheres to the second surface at a $15^{th}$ cycle with an adhesion strength of at least about 95% of an adhesion strength that the adhesive surface adhered to the first surface on a first cycle.

27. A pressure-sensitive adhesive material, the material comprising:
  a visco-elastic layer including a weakly or partially cross-linked first elastomer;
  an elastic layer placed over the visco-elastic layer, the elastic layer including a second elastomer exhibiting a higher degree of cross-linking than first elastomer and a thickness of 100 micrometers or less; and
  an adhesive surface on the elastic layer on a surface thereof opposite the visco-elastic layer, wherein the adhesive surface has an adhesive strength of at least 200 mJ/m$^2$.

28. The pressure-sensitive adhesive material of claim 27, wherein the elastic layer is adjacent and bonded to a surface of the visco-elastic layer.

29. The pressure-sensitive adhesive material of claim 27, wherein the visco-elastic layer has a thickness of about 1 micrometers to about 1000 micrometers.

30. The pressure-sensitive adhesive material of claim 27, wherein the visco-elastic layer comprises at least one of silicone, rubber elastomer, acrylate copolymer, mono-acrylate oligomer, multi acrylate oligomer, styrene-butadiene-styrene, styrene-ethylene/butylene-styrene, styrene-ethylene/propylene, styrene-isoprene-styrene, or vinyl ether.

31. The pressure-sensitive adhesive material of claim 30, wherein a cross-linking agent for the visco-elastic layer comprises at least one of methylhydrogen-siloxane, benzoyl peroxide, bis-aziridines, multi-functional isocyanate, multiacrylate, or copolymerizable aromatic ketone monomer.

32. The pressure-sensitive adhesive material of claim 30, wherein the elastic layer comprises at least one of silicone, rubber elastomer, acrylate copolymer, mono-acrylate oligomer, multi acrylate oligomer, styrene-butadiene-styrene, styrene-ethylene/butylene-styrene, styrene-ethylene/propylene, styrene-isoprene-styrene, or vinyl ethers with high crosslinking percentage and low tackiness.

33. The pressure-sensitive adhesive material of claim 32, wherein the adhesive surface of the pressure-sensitive adhesive material after 15 cycles of adhesion and debonding has the adhesive strength of at least 50% of an adhesive strength after a first cycle of adhesion and debonding.

* * * * *

UNITED STATES PATENT AND TRADEMARK OFFICE
CERTIFICATE OF CORRECTION

PATENT NO.        : 9,540,546 B2
APPLICATION NO.   : 13/982458
DATED             : January 10, 2017
INVENTOR(S)       : Sharma et al.

It is certified that error appears in the above-identified patent and that said Letters Patent is hereby corrected as shown below:

In the Specification

In Column 1, Line 6, delete "§371" and insert -- § 371 --, therefor.

In Column 2, Line 33, delete "EMBODIMENT" and insert -- EMBODIMENTS --, therefor.

In Column 4, Line 13, delete "ENE PSA" and insert -- E/VE PSA --, therefor.

Signed and Sealed this
Sixteenth Day of May, 2017

Michelle K. Lee
*Director of the United States Patent and Trademark Office*